United States Patent
Lazzarini et al.

(10) Patent No.: US 12,004,533 B2
(45) Date of Patent: Jun. 11, 2024

(54) MACHINE FOR MAKING LIQUID AND SEMI-LIQUID PRODUCTS

(71) Applicant: ALI GROUP S.R.L.-CARPIGIANI, Cernusco Sul Naviglio (IT)

(72) Inventors: Roberto Lazzarini, Reggio Emilia (IT); Federico Tassi, Bologna (IT)

(73) Assignee: ALI GROUP S.R.L.-CARPIGIANI, Cernusco Sul Naviglio (IT)

( * ) Notice: Subject to any disclaimer, the term of this patent is extended or adjusted under 35 U.S.C. 154(b) by 72 days.

(21) Appl. No.: 17/229,502

(22) Filed: Apr. 13, 2021

(65) Prior Publication Data

US 2021/0321637 A1     Oct. 21, 2021

(30) Foreign Application Priority Data

Apr. 16, 2020 (IT) .......................... 102020000008089

(51) Int. Cl.
| | |
|---|---|
| *A23G 9/22* | (2006.01) |
| *A23G 9/10* | (2006.01) |
| *F25C 1/145* | (2018.01) |

(52) U.S. Cl.
CPC ............ *A23G 9/224* (2013.01); *A23G 9/106* (2013.01); *A23G 9/222* (2013.01); *A23G 9/227* (2013.01); *F25C 1/145* (2013.01)

(58) Field of Classification Search
CPC ........ A23G 9/224; A23G 9/222; A23G 9/106; F25C 1/145
See application file for complete search history.

(56) References Cited

U.S. PATENT DOCUMENTS

| | | | |
|---|---|---|---|
| 2004/0045311 A1 | 3/2004 | Bonato | |
| 2004/0045312 A1* | 3/2004 | Bonato | ............... A23G 9/224 62/342 |

(Continued)

FOREIGN PATENT DOCUMENTS

| | | |
|---|---|---|
| CN | 105636681 A | 6/2016 |
| CN | 109463523 A | 3/2019 |

(Continued)

OTHER PUBLICATIONS

English Language translation of DE 870423 to Herzog (Year: 1953).*

(Continued)

*Primary Examiner* — Cassey D Bauer
(74) *Attorney, Agent, or Firm* — SHUTTLEWORTH & INGERSOLL, PLC; Timothy J. Klima

(57) ABSTRACT

A machine for making liquid or semi-liquid food products includes a frame and a thermal system, which performs at least one thermodynamic cycle using a main heat exchanger fluid, and a production unit. The production unit is provided with a processing container having a cavity which defines a processing chamber for making a liquid or semi-liquid food product, a stirrer, applied or applicable on the frame at a fixed position and fitted or fittable in the processing container, and coupling means between the processing container and the drive shaft to allow coupling and hence transmission of motion from the motor to the processing container. In particular, the stirrer is provided with an inner core and an outer covering made of different materials.

13 Claims, 5 Drawing Sheets

(56) References Cited

U.S. PATENT DOCUMENTS

| | | | |
|---|---|---|---|
| 2016/0192675 A1* | 7/2016 | Abu-Ali | A23G 9/22 |
| | | | 426/112 |
| 2016/0366906 A1* | 12/2016 | Geng | B01F 35/221422 |
| 2018/0020693 A1 | 1/2018 | Katz | |
| 2019/0069573 A1* | 3/2019 | Cocchi | A23G 9/103 |
| 2020/0056814 A1 | 2/2020 | Fonte et al. | |

FOREIGN PATENT DOCUMENTS

| | | | | |
|---|---|---|---|---|
| DE | 870423 | * | 3/1953 | A23G 9/106 |
| EP | 1396194 A1 | | 3/2004 | |
| EP | 3453264 A1 | | 3/2019 | |
| WO | 03026784 A1 | | 4/2003 | |

OTHER PUBLICATIONS

Definition of Fixed, Merriam-Webster, https://www.merriam-webster.com/dictionary/fixed (Year: 2023).*

Definition of Engage, Merriam-Webster, https://www.merriam-webster.com/dictionary/engage (Year: 2023).*

Italian Search Report dated Dec. 3, 2020 from counterpart Italian Patent Application No. 202000008089.

Italian Office Action dated Apr. 25, 2023 from counterpart European Patent Application No. 21168438.6.

Chinese Office Action dated Dec. 28, 2023 from counterpart Chinese App No. 202110408064.5.

\* cited by examiner

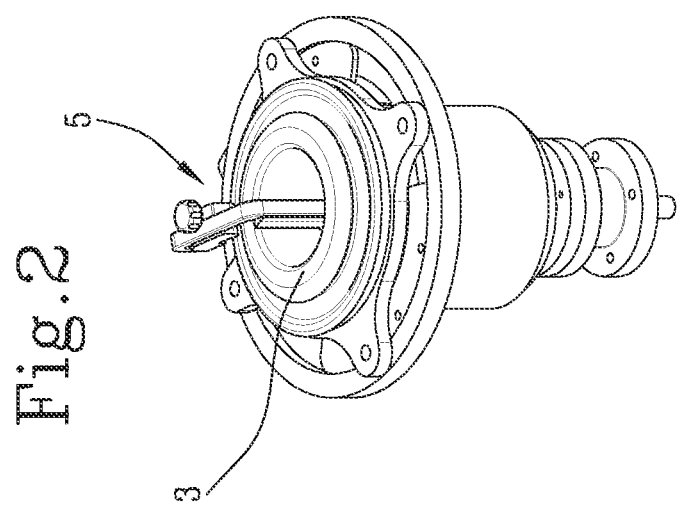
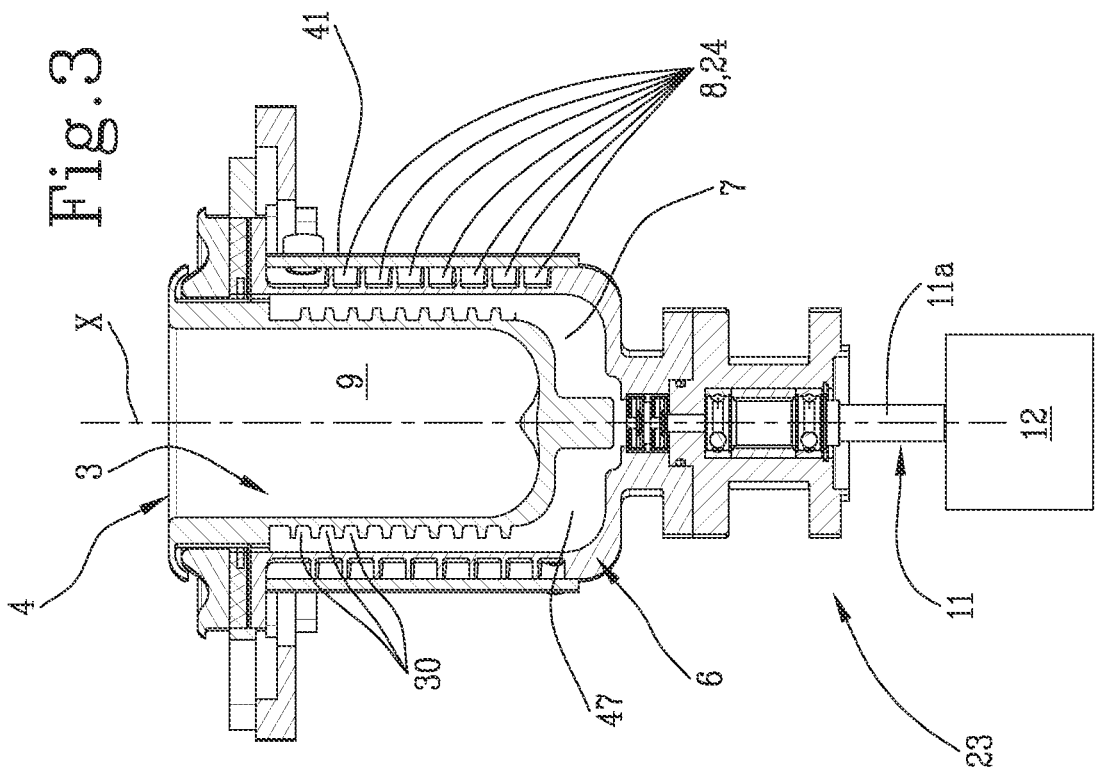

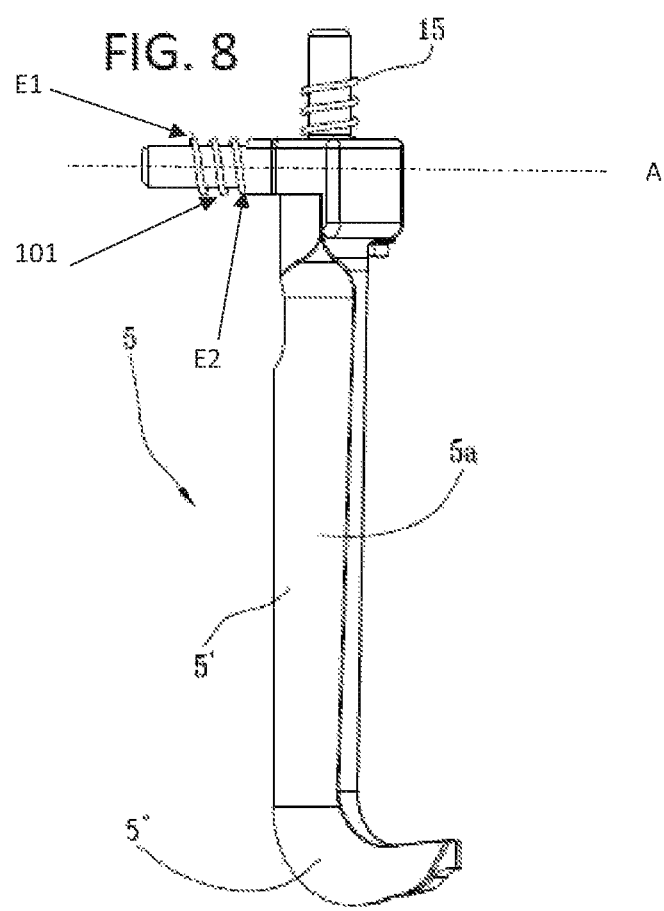

US 12,004,533 B2

MACHINE FOR MAKING LIQUID AND SEMI-LIQUID PRODUCTS

This application claims priority to Italian Patent Application 102020000008089 filed Apr. 16, 2020, the entirety of which is incorporated by reference herein.

BACKGROUND OF THE INVENTION

This invention relates to a machine and a method for making liquid and semi-liquid products of the sector of ice cream (gelato, sorbets, soft-serve ice cream, etc.), bakery and confectionery (custard and chocolate creams, etc.) or catering (savory soups, etc.).

As is known, a need which is strongly felt in this sector is that of being able to make ice cream type products in small portions very quickly and to a customer's individual request.

In particular, one need which is felt particularly strongly in the trade is that of making liquid or semi-liquid food products instantly, while the customer waits.

A need which is felt particularly strongly by machine manufacturers, on the other hand, is that of being able to provide a machine which is capable of making liquid and semi-liquid products of the ice cream sector in very small quantities (single portions) and which is particularly simple and reliable.

Another particularly strongly felt need in the sector in question is the need for a machine which allows reducing the risks of product contamination, thus increasing food safety.

SUMMARY OF THE INVENTION

The aim of this invention is to provide a machine for making liquid or semi-liquid food products, which allows satisfying the above mentioned need and, more specifically, a machine which allows making small quantities of products of the ice cream, bakery and confectionery or catering sector particularly easily based on the requirements expressed on the spot by the customer.

Yet another aim of the invention is to provide a machine for making liquid and semi-liquid products of the ice cream, bakery and confectionery or catering sector and which is particularly safe in terms of food hygiene.

A yet further aim of the invention is to provide a machine which can make liquid and semi-liquid products of the ice cream, bakery and confectionery or catering sector and which is capable of optimizing product processing.

According to the invention, this aim is achieved by a machine for making liquid or semi-liquid products of the ice cream, bakery and confectionery or catering sector and comprising the technical features set out in one or more of the appended claims.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

FIG. 2 shows a schematic perspective view of a detail of the machine of FIG. 1;

FIG. 3 shows a cross-sectional view of the detail of FIG. 2;

FIG. 8 shows a further perspective view of a detail of the machine of the invention.

DESCRIPTION OF THE PREFERRED EMBODIMENTS

With reference to the accompanying drawings, the numeral 1 denotes a machine for making liquid or semi-liquid products of the ice cream, bakery and confectionery or catering sector.

The machine 1 is preferably designed to make products for the ice cream or bakery and confectionery or catering trades.

By products of the ice cream or bakery and confectionery or catering sector are meant products such as ice cream, (soft-serve ice cream, artisan gelato, sorbets, granitas, etc.) and products such as custard and chocolate creams or savory soups.

These products may be hot or cold, without distinction.

Preferably, but not exclusively, the machine 1 is an ice cream machine, suitable for making artisan gelato.

In the context of the invention, the term "ice cream" is used to mean a food preparation which is based on milk or milk-derived products and to which fruit, aromatics or other ingredients are added to obtain different flavors.

Figure 1:
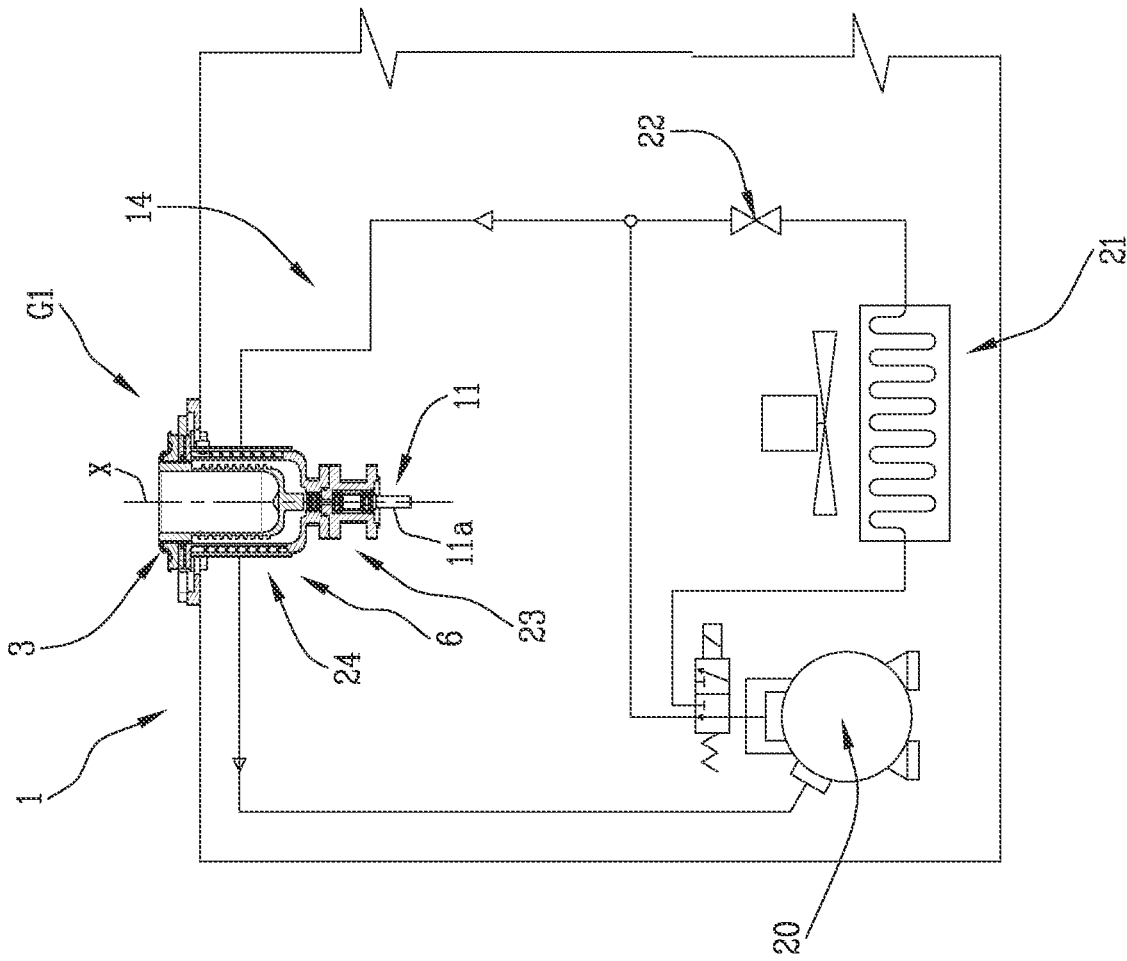
FIG. 1 is a schematic view of a machine according to this invention.

The machine 1, as illustrated in FIG. 1, comprises:

a frame 13;

a thermal system 14 for performing at least one thermodynamic cycle using a main heat exchanger fluid and including a compressor 20, a first heat exchanger 21, a second heat exchanger and a pressure reducing element 22, all having the main heat exchanger fluid flowing through them (as illustrated in FIG. 1);

a motor 11 equipped with a drive shaft 11a rotatable about a vertical axis X and a motor 12 to set the shaft 11a in rotation;

at least one production unit G1.

The production unit G1 comprises:

a cylindrical processing container 3 operated on by the thermal system 14 and provided with a cavity 9 which defines a processing chamber 4 for making a liquid or semi-liquid food product;

a stirrer 5, applied or applicable on the frame at a fixed position and fitted or fittable in the processing container 3;

coupling means 23 between the first processing container 3 and the drive shaft 11a to allow coupling and hence transmission of motion from the motor 11 to the first processing container 3 (through the drive shaft 11a).

It should be noted that the stirrer 5 is fixed to the machine frame; that is to say, while the first processing container 3 is driven in rotation (by the rotation of the drive shaft 11a), the stirrer remains fixed and does not rotate as one with the first processing container 3.

In a preferred embodiment, illustrated by way of non-limiting example in the accompanying drawings, there are also provided a secondary container 6, having a cavity 7 shaped to rotatably accommodate the container 3 and fixed relative to the frame 13, and channels 8 for circulating the main heat exchanger fluid, associated with the second container 6 and defining a second exchanger 24 of the thermal system 14 in which the main heat exchanger fluid circulates.

The machine 1 preferably also comprises a control and drive unit, configured to regulate and control the different working parts.

In this embodiment, the processing container 3 and the secondary container 6 are cylindrical and, in use, disposed coaxially.

Preferably, the machine 1 comprises a platform, provided with at least one hollow in which the processing container 3 and the secondary container 6 are inserted.

More specifically, the cavity 9 of the processing container 3 defining the processing chamber 4 is substantially cylindrical and the cavity 7 of the secondary container 6 is shaped to rotatably accommodate the processing container 3.

The cavity 9 of the processing container 3 is a cavity open only at the top and having a closed bottom.

The cavity 7 of the secondary container 6 is in turn open at the top to allow the processing container 3 to be inserted into it, and at the bottom to allow the first processing container 3 to be coupled to the drive shaft 11a, as described in more detail below.

With reference to the coupling means 23, these may comprise at least one ridge formed on the drive shaft 11a and at least one coupling groove formed in the container 3 or, more generally speaking, a splined coupling.

The processing container 3 can be removably accommodated in the cavity 7 of the secondary container 6 so that an operator can carry out maintenance, cleaning and/or replacement operations on the component or on other components of the machine 1 located near the container 3.

Defined between the processing container 3 and the secondary container 6 there is a gap 47—that is, an empty space 47—which can be filled with a secondary heat exchanger fluid.

The processing container 3 is provided on the outside of it with at least one channel 30, whose function is to allow optimum transmission of heat by means of a secondary heat exchanger fluid interposed between the first container 3 and the secondary container 6. When the first container 3 is driven in rotation, the presence of the channel 30 causes the secondary heat exchanger fluid to swirl, thus increasing the efficiency of heat exchange (making it possible to change from a state of natural convection to a state of forced convection).

The channel 30 extends on a lateral (outside) surface of the container 3, for example, a helical lateral surface of the container 3.

The machine 1 comprises a covering shell 41 which covers the channels 8 for circulating the main heat exchanger fluid and which is fixed externally of the secondary container 6 to sealedly cover the circulation channels 8.

The main heat exchanger fluid circulates inside the circulation channels 8.

The circulation channels 8 thus define the aforementioned second exchanger of the thermal system 14.

Thus, the main heat exchanger fluid is made to circulate in the circulation channels 8 by the pressure head generated by the compressor 20 of the thermal system.

Cooling and/or heating the product inside the container 3 is thus accomplished by two heat exchanger fluids, namely a main heat exchanger fluid and a secondary heat exchanger fluid, which exchange heat with each other (through other elements).

The product inside the processing container 3 is processed partly by the mechanical action applied by the stirrer 5 by which the product is mixed.

More specifically, the stirrer 5 is applied or applicable on the frame 13 at a fixed position and fitted or fittable in the processing container 3.

In other words, in use, the stirrer 5 is attached to the frame and the movement of the product relative to the stirrer 5 is induced by the rotation of the container 3 itself.

Figure 5:
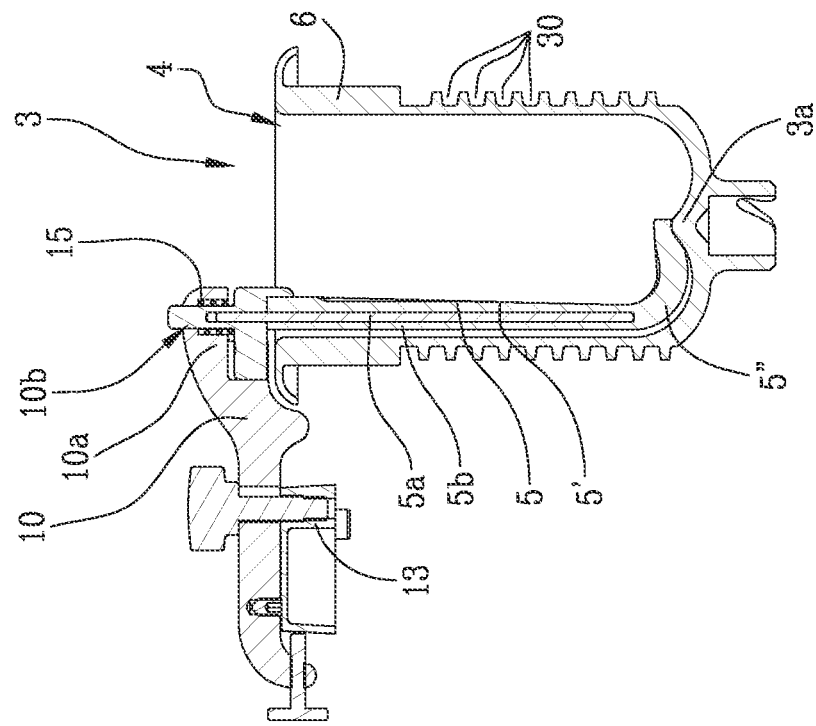
FIG. 5 shows a respective schematic cross-sectional view of a possible embodiment of a detail of the machine of FIG. 1.
Figure 4:
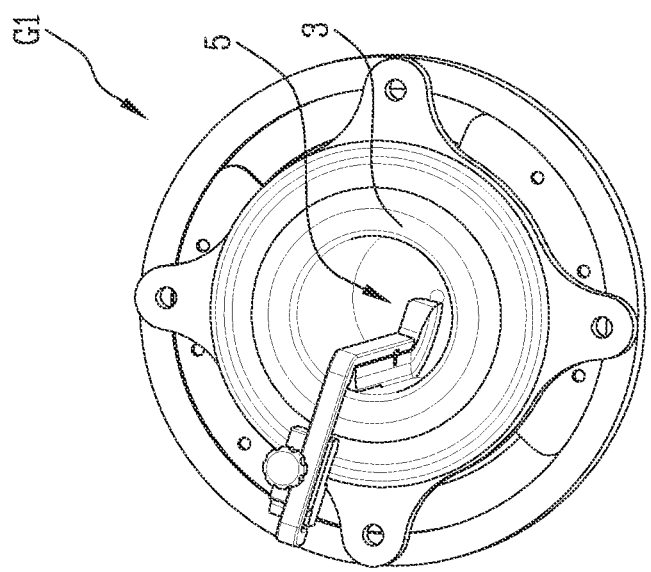
FIG. 4 is another perspective view of the detail of FIGS. 2 and 3.
Figure 6:
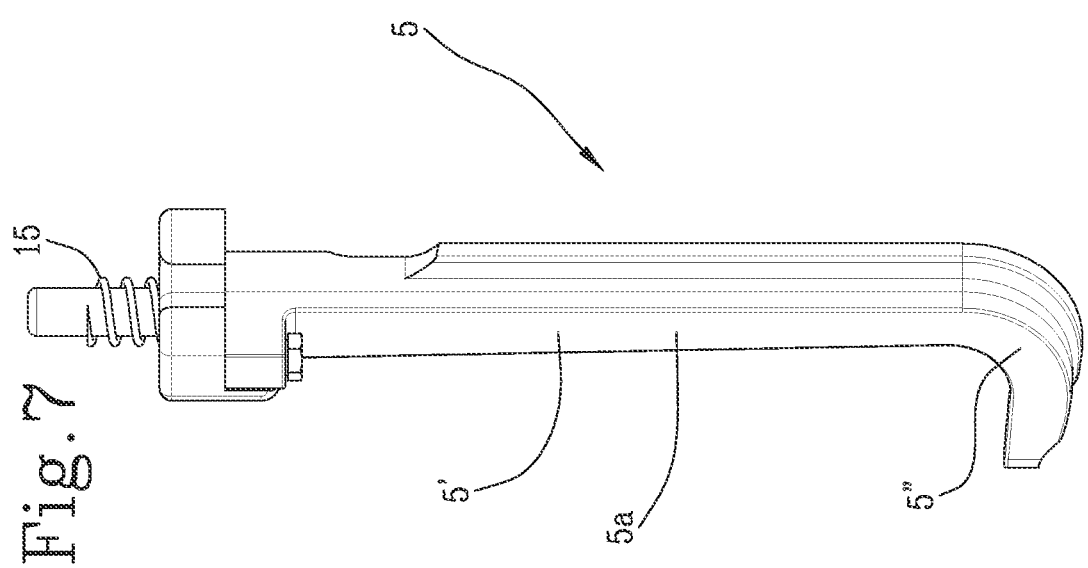
FIGS. 6 and 7 show respective perspective views of a detail of the machine of the invention.
Figure 7:
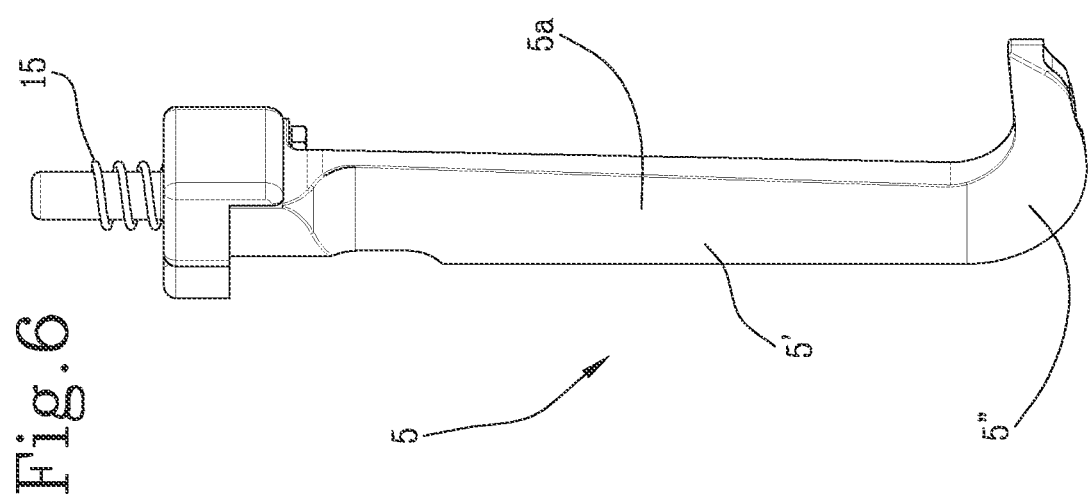

Structurally, as illustrated in FIG. 5, the stirrer 5 comprises an inner core 5a and an outer covering 5b.

The inner core 5a is completely enclosed in the outer covering 5b.

A distinctive feature of the invention regards the materials the inner core 5a and the outer covering 5b are made of. More specifically, the inner core 5a and the outer covering 5b are made of different materials.

The inner core 5a is made preferably of a metallic material or, in any case, a high-strength material, to give the stirrer 5 a resistant structure.

In other words, the inner core 5a defines the load-bearing structure of the stirrer 5, capable of resisting the mechanical stress it is subjected to during normal operation of the machine 1.

The outer covering 5b at least partly covers the inner core 5a and is configured, in use, to come into contact with the product. The outer covering 5b is made preferably of plastic material.

Still more preferably, the outer covering 5b is made of food safe plastic material, suitable for coming into contact with food, reducing the risk of contamination and increasing food safety.

According to another aspect, the outer covering 5b is made of a material that is easy to clean and sanitize.

Advantageously, this structure makes the stirrer 5 particularly robust.

Looking in more detail at the structure, the stirrer 5 has an elongate body 5' and a lower portion 5".

Preferably, the stirrer 5 has the shape of a J.

More specifically, the elongate body 5' extends along the height of the container 3 and has a substantially elongate structure with a predominant direction of extension which, in use, is preferably vertical.

The bottom portion 5", on the other hand, is shaped to match a bottom portion 3a of the container.

More specifically, the bottom portion 3a of the container 3 has an axisymmetric shape with an upwardly concave axisymmetric depression and a central raised portion, as shown in FIG. 5.

The bottom portion 5" of the stirrer 5 is shaped to match the shape of the container 3 so as to act in conjunction therewith to optimize product processing to help prevent the product from sticking to the walls of the container and forming unwanted lumps.

According to another structural aspect, the stirrer 5 has, along its main direction of extension, a transverse cross section that is substantially constant in shape and, preferably, also in size.

Specifically, the section with constant shape extends from the elongate body 5' to the bottom portion 5" of the stirrer 5 and is preferably polygonal (rectangular, trapezoidal or triangular) or, alternatively, circular or even elliptic.

The stirrer 5 is preferably applied or applicable on the frame 13 by an anchoring means 10.

More specifically, the anchoring means 10 is fittable to the frame 13 and is configured to engage an upper portion of the elongate body 5' of the stirrer 5.

Preferably, the anchoring means 10 is mounted removably to the frame 13 by at least one threaded, quick connect-disconnect means (for example, a threaded means provided with an operating knob).

Preferably, the anchoring means 10 has an elongate shape which, in a mounted configuration, is oriented transversely to the elongate body 5' of the stirrer 5 and, more specifically, radially relative to the container 3.

According to a further aspect of this invention, the machine comprises a thrust element 15 operating on the stirrer 5 and configured to keep the stirrer 5 pressed towards the bottom portion 3a of the container 3, in particular making contact between the stirrer 5 and the bottom portion 3a to apply a scraping action. Consequently, cleaning the container is easier because the scraping action prevents the formation of encrusted lumps on the inside walls of the container.

Preferably, the thrust element 15 is made in the form of an elastically deformable element, specifically a helical compression spring.

In the preferred embodiment, the thrust element 15 is interposed between the anchoring means 10 and the upper portion of the elongate body 5'.

More specifically, the anchoring means 10 has an end portion 10a provided with a hole 10b having at least two portions that differ in diameter: a first, upper portion of the hole 10b slidably accommodates an end pin of the stirrer 5 and a second, lower portion of the hole 10b at least partly accommodates the thrust element 15.

That way, one end of the thrust element 15 is housed in the second portion of the hole 10b and is integral with the anchoring means 10, and the other, opposite end is integral with the upper portion of the elongate body 5'.

As may be seen in FIG. 8, the machine further comprises an additional (second) thrust element 101 operating on the stirrer 5 and configured to keep the stirrer 5 pressed against the side walls of the container 3, in particular making contact between the stirrer 5 and the side walls of the container 3 to apply a scraping action.

This additional (second) thrust element 101 is independent of the thrust element 15 described previously: the machine 1 may comprise one or both of the thrust elements (15, 101).

Preferably, the additional thrust element 101 comprises a spring.

Preferably, the spring of the additional thrust element 101 is configured to be normally—that is, during normal use—in an extended configuration.

The elastic return force of the spring of the additional thrust element 101 is thus directed along the direction A towards the end E2 of the walls of the container 3.

More precisely, the end E1 of the spring is fixed to the frame of the machine, while the end E2 of the spring is fixed to the stirrer 5.

The elastic force of the spring thus tends to bring the stirrer 5 into contact with the side wall.

Advantageously, the machine described herein overcomes the disadvantages of the prior art since it is capable of optimizing the process by which the product is made.

This result is obtained thanks to the shape of the stirrer, whose distinctive features optimize its functionality.

Advantageously, also, the machine described herein overcomes the disadvantages of the prior art since it is capable of reducing the risk of product contamination and thus increases food safety.

This result is obtained thanks to the structure of the stirrer, specifically thanks to the possibility of easily removing the stirrer to perform maintenance, cleaning and/or replacement operations and thanks also to the materials it is made of.

What is claimed is:

1. A machine for making liquid or semi-liquid food products, comprising:
   a frame;
   a thermal system for performing at least one thermodynamic cycle using a main heat exchanger fluid and including a compressor, a heat exchanger and a pressure reducing element, all affected by circulation of the main heat exchanger fluid;
   a motor including a drive shaft rotatable about a vertical axis;
   a production unit comprising:
      a processing container provided with a cavity which defines a processing chamber for making a liquid or semi-liquid food product, where the thermal system operates on the processing container;
      a stirrer, applied or applicable on the frame at a fixed position and fitted or fittable in the processing container;
   a coupler positioned between the processing container and the drive shaft, the coupler including a driving surface to engage the processing container and couple the processing container to the drive shaft for transmitting motion from the motor to the processing container;
   wherein the stirrer includes an inner core and an outer covering made of different materials;
   wherein the stirrer comprises an elongate body extending along a height of the processing container and a lower portion which is shaped to match a bottom portion of the processing container;
   a first spring operating on the stirrer and configured to keep the stirrer pressed towards the bottom portion of the processing container to make contact between the stirrer and the bottom portion to apply a first scraping action;
   a second spring additionally operating on the stirrer and configured to keep the stirrer pressed against a side wall of the processing container to make contact between the stirrer and the side wall of the processing container to apply a second scraping action, wherein the second spring comprises a first end and a second end, the first end fixed to the frame and the second end engaging the stirrer to exert a direct spring force path between the frame and the stirrer biasing the stirrer toward the side wall;
   wherein the stirrer is J-shaped;
   wherein the stirrer has a predominant vertical portion.

2. The machine according to claim 1, and further comprising at least one chosen from wherein the inner core of the stirrer is made of a metallic material, and wherein the outer covering of the stirrer is made of a plastic material.

3. The machine according to claim 1, and further comprising at least one chosen from wherein the inner core of the stirrer is made of a metallic material, and wherein the outer covering of the stirrer is made of a different metallic alloy.

4. The machine according to claim 1, and further comprising at least one chosen from wherein the inner core of the stirrer is made of a metallic material, and wherein the outer covering of the stirrer is made of a ceramic material.

5. The machine according to claim 1, and further comprising at least one chosen from wherein the inner core of the stirrer is made of a metallic material, and wherein the outer covering of the stirrer is made of a composite material.

6. The machine according to claim 1, wherein the first spring is a helical compression spring.

7. The machine according to claim 1, and further comprising an anchoring arm with a first surface fixable to the frame and a second surface configured to engage an upper portion of the elongate body and wherein the first spring is interposed between the anchoring arm and the upper portion of the elongate body.

8. The machine according to claim 7, wherein the anchoring arm is mounted removably to the frame by at least one threaded fastener including an operating knob.

9. The machine according to claim 7, wherein the anchoring arm has an elongate shape which, in an assembled configuration, is oriented transversely to the elongate body of the stirrer, and wherein the anchoring arm has an end portion including a hole having first and second portions with different diameters, the first portion of the hole slidably housing an end pin of the stirrer, and the second portion of the hole at least partly housing the first spring.

10. The machine according to claim 1, wherein the stirrer has, along a main direction of extension thereof, a transverse cross section that is substantially constant in shape.

11. The machine according to claim 10, wherein the transverse cross section that is substantially constant in shape extends from the elongate body to the lower portion of the stirrer.

12. The machine according to claim 10, wherein the transverse cross section is substantially constant in size.

13. A machine for making liquid or semi-liquid food products, comprising:
  a frame;
  a thermal system for performing at least one thermodynamic cycle using a main heat exchanger fluid and including a compressor, a heat exchanger and a pressure reducing element, all affected by circulation of the main heat exchanger fluid;
  a motor including a drive shaft rotatable about a vertical axis;
  a production unit comprising:
  a processing container provided with a cavity which defines a processing chamber for making a liquid or semi-liquid food product, where the thermal system operates on the processing container;
  a stirrer, applied or applicable on the frame at a fixed position and fitted or fittable in the processing container;
  a coupler positioned between the processing container and the drive shaft, the coupler including a driving surface to engage the processing container and couple the processing container to the drive shaft for transmitting motion from the motor to the processing container;
  wherein the stirrer includes an inner core and an outer covering made of different materials;
  a first spring operating on the stirrer and configured to keep the stirrer pressed towards the bottom portion of the processing container to make contact between the stirrer and the bottom portion to apply a first scraping action;
  an anchoring arm with a first surface fixable to the frame and a second surface configured to engage an upper portion of the elongate body and wherein the first spring is interposed between the anchoring arm and the upper portion of the elongate body;
  wherein the anchoring arm has an elongate shape which, in an assembled configuration, is oriented transversely to the elongate body of the stirrer, and wherein the anchoring arm has an end portion including a hole having first and second portions with different diameters, the first portion of the hole slidably housing an end pin of the stirrer, and the second portion of the hole at least partly housing the first spring.

* * * * *